United States Patent
Ruh et al.

(10) Patent No.: US 9,435,444 B2
(45) Date of Patent: Sep. 6, 2016

(54) VALVE SYSTEM

(71) Applicant: The Boeing Company, Chicago, IL (US)

(72) Inventors: Anthony Charles Ruh, Seattle, WA (US); Jonathan Asher Schweiger, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 153 days.

(21) Appl. No.: 14/249,688

(22) Filed: Apr. 10, 2014

(65) Prior Publication Data

US 2015/0292631 A1    Oct. 15, 2015

(51) Int. Cl.
*F16K 11/052* (2006.01)
*F16K 11/02* (2006.01)

(52) U.S. Cl.
CPC .............. *F16K 11/052* (2013.01); *F16K 11/02* (2013.01); *F16K 11/0525* (2013.01); *Y10T 137/265* (2015.04); *Y10T 137/268* (2015.04); *Y10T 137/2652* (2015.04); *Y10T 137/2657* (2015.04); *Y10T 137/2695* (2015.04); *Y10T 137/7898* (2015.04)

(58) Field of Classification Search
CPC .... F16K 11/02; F16K 11/04; F16K 11/0525; F16K 31/44; Y10T 137/265; Y10T 137/2652; Y10T 137/2657; Y10T 137/2663; Y10T 137/268; Y10T 137/2695; Y10T 137/7898

USPC .......... 137/118.01, 118.02, 118.04, 118.06, 137/119.03, 119.09, 513, 521, 527, 527.8, 137/625.44
See application file for complete search history.

(56) References Cited

U.S. PATENT DOCUMENTS

| | | | | |
|---|---|---|---|---|
| 3,545,470 A | * | 12/1970 | Paton | B65G 53/56 137/101 |
| 3,674,214 A | * | 7/1972 | Brown | B05B 1/3006 239/459 |
| 5,713,389 A | * | 2/1998 | Wilson, Jr. | E21B 34/06 137/515.7 |
| 6,742,995 B1 | * | 6/2004 | Wood | F04B 35/06 137/269 |
| 8,020,631 B2 | * | 9/2011 | Kobayashi | B25B 21/00 137/625.43 |

* cited by examiner

*Primary Examiner* — John K Fristoe, Jr.
*Assistant Examiner* — Richard K Durden
(74) *Attorney, Agent, or Firm* — Yee & Associates, P.C.

(57) ABSTRACT

A method and apparatus for directing a flow of a fluid. The apparatus comprises a housing, an inlet port, a first outlet port, a second outlet port, and a moveable barrier. The housing has a chamber inside of the housing. The inlet port is in communication with the chamber. The first outlet port and the second outlet port are also in communication with the chamber. The moveable barrier is located in the chamber and rotatable about an axis between a closed position and an open position. The moveable barrier covers the second outlet port in the closed position. The open position allows a fluid to flow through the chamber and out of the second outlet port. The closed position reduces a flow of the fluid through the chamber and out of the second outlet port.

20 Claims, 13 Drawing Sheets

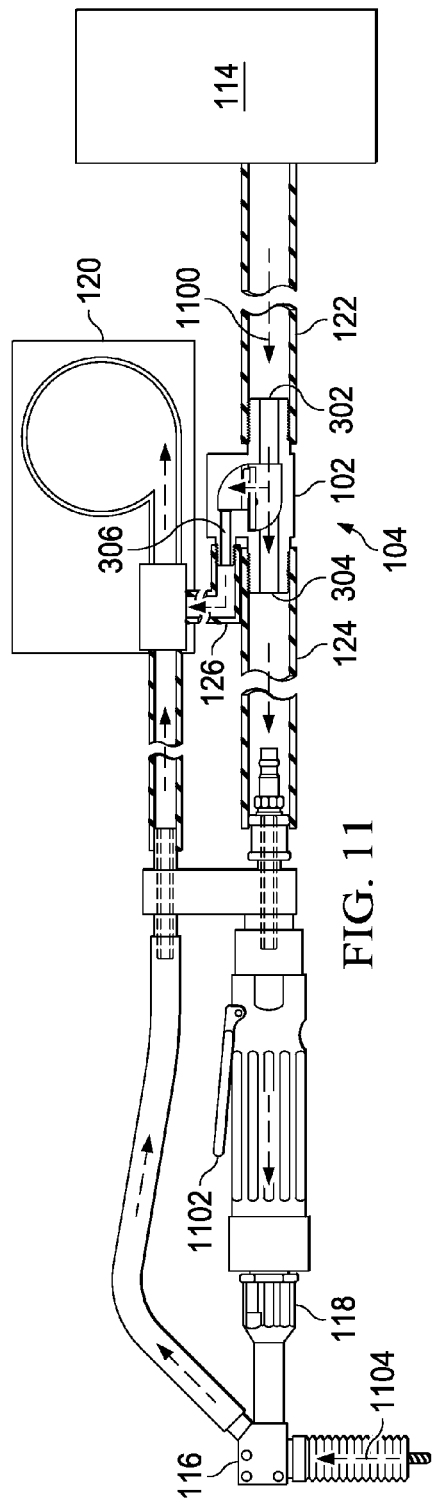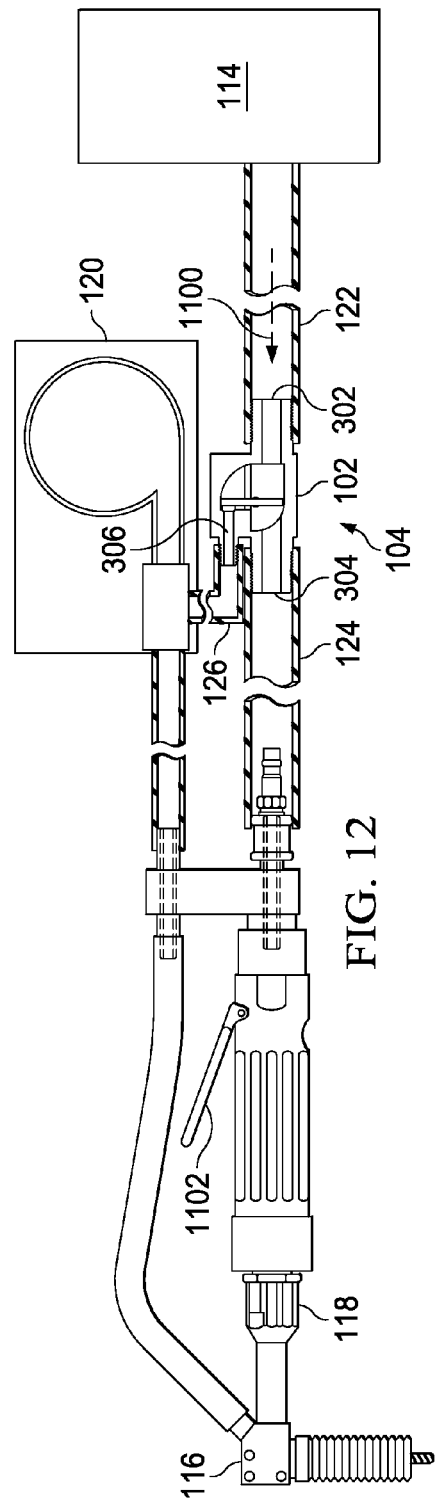

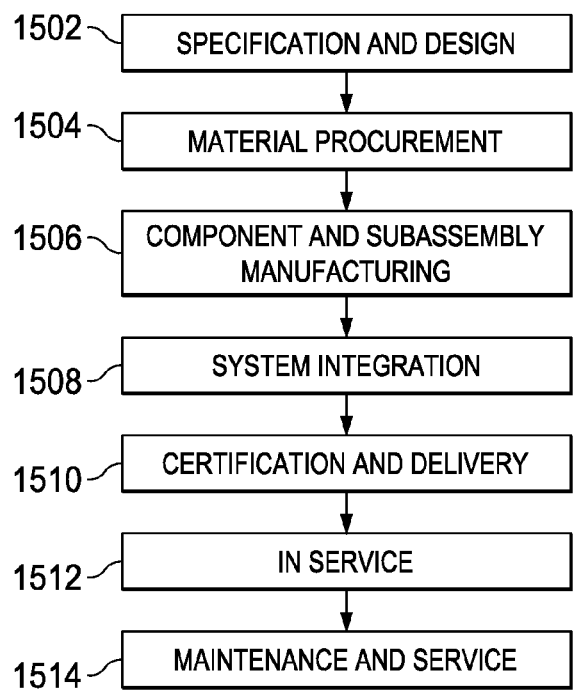
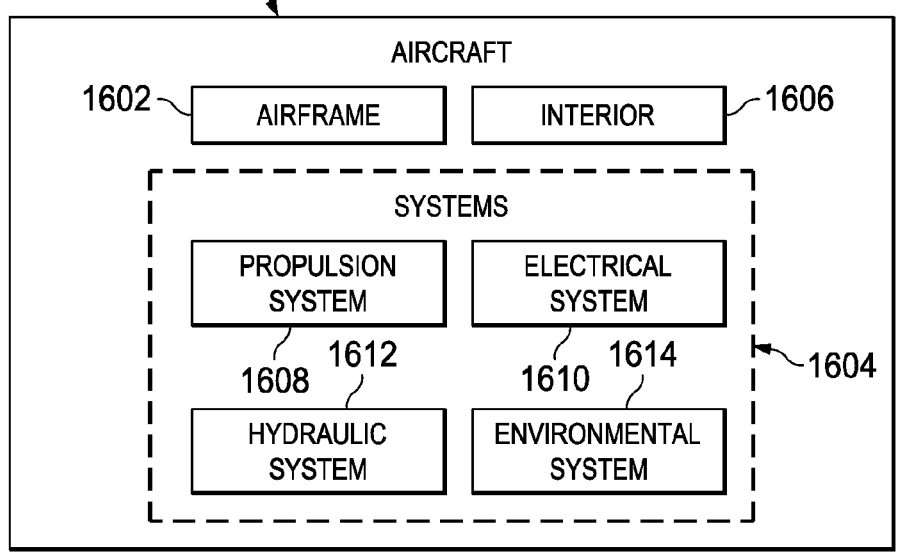

VALVE SYSTEM

BACKGROUND INFORMATION

1. Field

The present disclosure relates generally to fluid flow and, in particular, to directing fluid flow through a valve system. Still more particularly, the present disclosure relates to a method and apparatus for directing a flow of fluid through a valve system to a plurality of tools.

2. Background

Manufacturing structures is a complex process. The manufacturing process may include formation and assembly of components to form each structure. As an example, two components may be fastened together to form a final structure. In another illustrative example, two or more components may be bonded together using an adhesive. A structure may be formed from one or more metal components, composite components, and other suitable types of components.

In manufacturing a structure, various operations may be performed on the structure. These operations include, for example, drilling, sealing, hammering, heating, cooling, grinding, cutting, inspecting, and other suitable operations.

Different types of tools are used to perform operations on the structure. For instance, a hammer, a drill, a cooling system, a heating system, an ultrasound inspection device, a rivet gun, and other types of tools may be used to perform desired operations on the structure. Each tool may perform one type of operation or may be integrated to perform a number of different operations at the same time.

Oftentimes, these tools take the form of pneumatic tools. In this illustrative example, a pneumatic tool is a device driven by pressurized air. An air compressor supplies the pneumatic tool with the pressurized air.

In some cases, it is desirable to use more than one pneumatic tool at the same time to perform operations on a structure. As an example, a pneumatic grinder may be used with a pneumatic vacuum. In this example, as the grinder removes material from the structure, the pneumatic vacuum collects the debris. The combined use of these two tools allows an operator to perform grinding operations while reducing undesired debris in the work area.

As another example, a pneumatic drill may be used with a nozzle that directs cooled air onto the surface of the aircraft structure. In this instance, the cooled air reduces the risk of undesired heating of the structure during drilling.

With the use of two pneumatic tools, both tools may be supplied by a single air compressor. The air compressor may supply the two tools through two separate hoses running off of a manifold. A valve may be used to direct the flow of air from the air compressor to operate both tools. An additional valve may be needed for the second tool. These valves, however, may not direct the flow of air to one or both of the tools in a desired manner. Therefore, it would be desirable to have a method and apparatus that take into account at least some of the issues discussed above, as well as other possible issues.

SUMMARY

Embodiments of the disclosure provide a method and apparatus to direct the flow of a fluid through a valve system. The valve system is used to supply two tools with fluid using a single fluid supply system. In this example, the fluid supply system takes the form of an air compressor with hoses that supply air to each of the tools.

In an illustrative embodiment, the valve system has an inlet port and two outlet ports. The inlet port is in communication with a chamber in a housing of the valve system. The inlet port is also in communication with a hose connected to the air compressor.

The first outlet port is in communication with the chamber in the housing of the valve system. The first outlet port is also in communication with a first pneumatic tool. In this illustrative example, the first pneumatic tool may be a primary tool used to perform an operation on a structure.

The second outlet port is in communication with the chamber in the housing of the valve system. The second outlet port is also in communication with a hose connected to a second pneumatic tool. In this illustrative example, the second pneumatic tool may be an accessory tool used in conjunction with the primary tool.

The valve system directs the flow of air to the two pneumatic tools. A moveable barrier is located within the chamber in the housing of the valve system. The moveable barrier partially obscures the first outlet port to the primary tool. The moveable barrier fully obscures the second outlet port to the accessory tool. In response to use of the primary tool, the moveable barrier rotates about an axis to cover and uncover the second outlet port.

When the primary tool is activated, the air compressor supplies air to the primary tool through the valve system. The flow of the air from the inlet port, through the chamber, and out of the first outlet port causes the moveable barrier to open the second outlet port. Air then flows through the second outlet port and to the accessory tool.

When the primary tool is deactivated, the flow of air between the inlet port and the first outlet port ceases. As a result, the moveable barrier returns to its resting position, drawn back by the drag of fluid rushing past the moveable barrier into the second outlet port, to close the second outlet port. Air no longer flows to the accessory tool.

The valve system described herein provides coordinated control of a primary tool and an accessory tool. An operator may control air flow to both tools by activating a control valve in the primary tool. The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a schematic of a tooling system in accordance with an illustrative embodiment;

FIG. 12 is an illustration of a schematic of a tooling system in accordance with an illustrative embodiment;

FIG. 15 is an illustration of an aircraft manufacturing and service method in the form of a block diagram in accordance with an illustrative embodiment; and FIG. 16 is an illustration of an aircraft in the form of a block diagram in which an illustrative embodiment may be implemented.

DETAILED DESCRIPTION

The illustrative embodiments recognize and take into account one or more different considerations. For example, the illustrative embodiments recognize and take into account that it may be desirable to control the operation of two devices by activating a single device. As an example, it may be desirable to turn on and off a first tool and a second tool at the same time. Turning two tools on and off at the same time may promote efficiency in the operation of these two tools.

The illustrative embodiments also recognize and take into account that when using pneumatic tools, it may be desirable to direct the flow of air to the first tool and the second tool by controlling the flow of air to the first tool. It also may be desirable to control air flow to the second tool without modifying the first tool. As an example, the illustrative embodiments recognize and take into account that it may be desirable to activate an air flow control valve in the first tool and simultaneously allow air to flow to a second tool, without modifying the structure of the first tool.

The illustrative embodiments further recognize and take into account that it may be desirable to stop the flow of air to the second tool without manually operating a valve connected to the second tool. For instance, it may be desirable to close an outlet port to a second tool without manually closing a ball valve associated with the second tool.

Thus, the illustrative embodiments provide a method and apparatus for directing a flow of fluid through a valve system. The valve system has a housing having a chamber inside of the housing, an inlet port, a first outlet port, a second outlet port, and a moveable barrier. The inlet port is in communication with the chamber. The first outlet port and the second outlet port are also in communication with the chamber. The moveable barrier is located in the chamber and rotatable about an axis between a closed position and an open position. The moveable barrier covers the second outlet port when the moveable barrier is in the closed position. The open position of the moveable barrier allows a fluid to flow through the chamber and out of the second outlet port. The closed position of the moveable barrier reduces a flow of the fluid through the chamber and out of the second outlet port.

Figure 1:
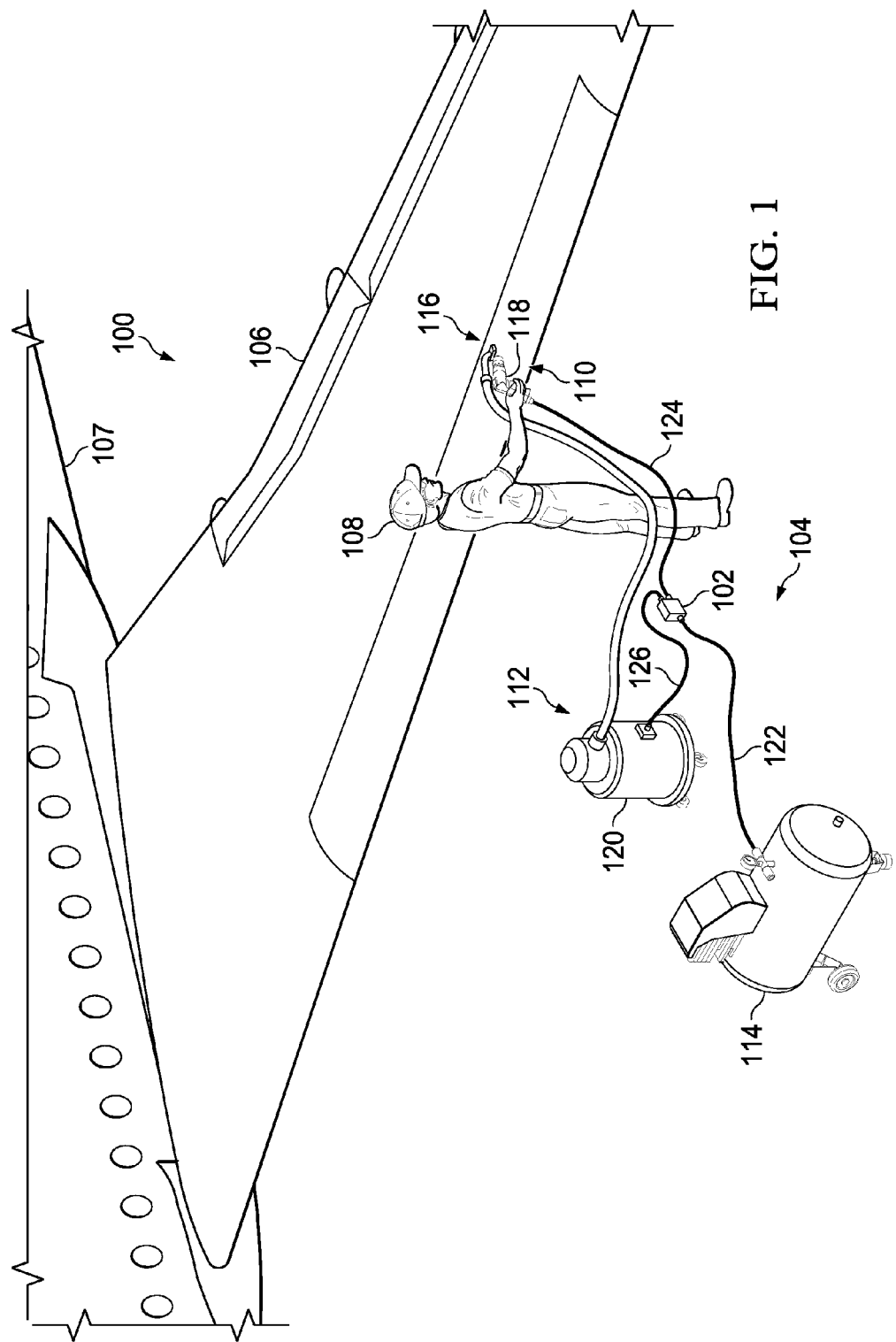
FIG. 1 is an illustration of a fluid flow environment in accordance with an illustrative embodiment.

Referring now to the figures and, in particular, with reference to FIG. 1, an illustration of a fluid flow environment is depicted in accordance with an illustrative embodiment. In this depicted example, fluid flow environment 100 is an environment in which valve system 102 is used to direct fluid to tooling system 104. Tooling system 104 is used to perform operations on wing 106 of aircraft 107 in this illustrative example.

As depicted, operator 108 uses tooling system 104 to perform operations on wing 106. For example, operator 108 may use tooling system 104 to perform rework on wing 106. In another illustrative example, operator 108 uses tooling system 104 to assemble a portion of wing 106.

In this depicted example, tooling system 104 includes first pneumatic tool 110, second pneumatic tool 112, air supply system 114, and integrated tooling head 116. In this illustrative example, a pneumatic tool is a tool that is driven by compressed air.

First pneumatic tool 110 takes the form of a pneumatic drill 118 in this illustrative example. Pneumatic drill 118 may be used to drill holes in wing 106.

Second pneumatic tool 112 takes the form of pneumatic vacuum 120 in this illustrative example. Pneumatic vacuum 120 is used with pneumatic drill 118 to vacuum any debris that is caused by use of pneumatic drill 118. Debris may result from pneumatic drill 118 removing material from wing 106.

In this illustrative example, pneumatic drill 118 and pneumatic vacuum 120 are used simultaneously by operator 108 to perform drilling operations on wing 106. In other words, pneumatic drill 118 and pneumatic vacuum 120 are used at the same time.

In this depicted example, air supply system 114 supplies air to pneumatic drill 118 and pneumatic vacuum 120. Air supply system 114 takes the form of an air compressor in this illustrative example. Air supply system 114 directs air in air line 122, through valve system 102, and into pneumatic drill 118 and pneumatic vacuum 120.

As illustrated, valve system 102 directs a desired amount of air to pneumatic drill 118 and pneumatic vacuum 120. The desired amount of air for each of pneumatic drill 118 and pneumatic vacuum 120 is the amount of air needed to operate each device.

In this illustrative example, air is directed from valve system 102 to pneumatic drill 118 through air line 124. Air is directed from valve system 102 to pneumatic vacuum 120 through air line 126.

Integrated tooling head 116 is used by operator 108 to perform drilling and vacuuming operations on wing 106. In this illustrative example, a tooling head is a portion of a tool that moves to perform the function desired. For instance, a tooling head of a drill may include the drill bit and the portion of the drill held by an operator.

As used herein, a tooling head is "integrated" when the tooling head allows operator 108 to use both pneumatic drill 118 and pneumatic vacuum 120 in a single handheld device. In other illustrative examples, pneumatic drill 118 and pneumatic vacuum 120 may have separate tooling heads.

In this depicted example, valve system 102 allows operator 108 to direct air to pneumatic drill 118 and pneumatic vacuum 120 by activating only one of the two tools. In this instance, when operator 108 activates pneumatic drill 118, valve system 102 directs air from air supply system 114 to both pneumatic drill 118 and pneumatic vacuum 120.

When operator 108 deactivates pneumatic drill 118, valve system 102 reduces the flow of air to pneumatic vacuum 120. Specifically, valve system 102 takes the reduced flow of air to pneumatic drill 118 as an input and reduces flow to pneumatic vacuum 120 as an output. The reduction may result in halting the flow of air to pneumatic vacuum 120. In this manner, both devices are turned on and off simultaneously using a single switch on pneumatic drill 118.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Figure 2:
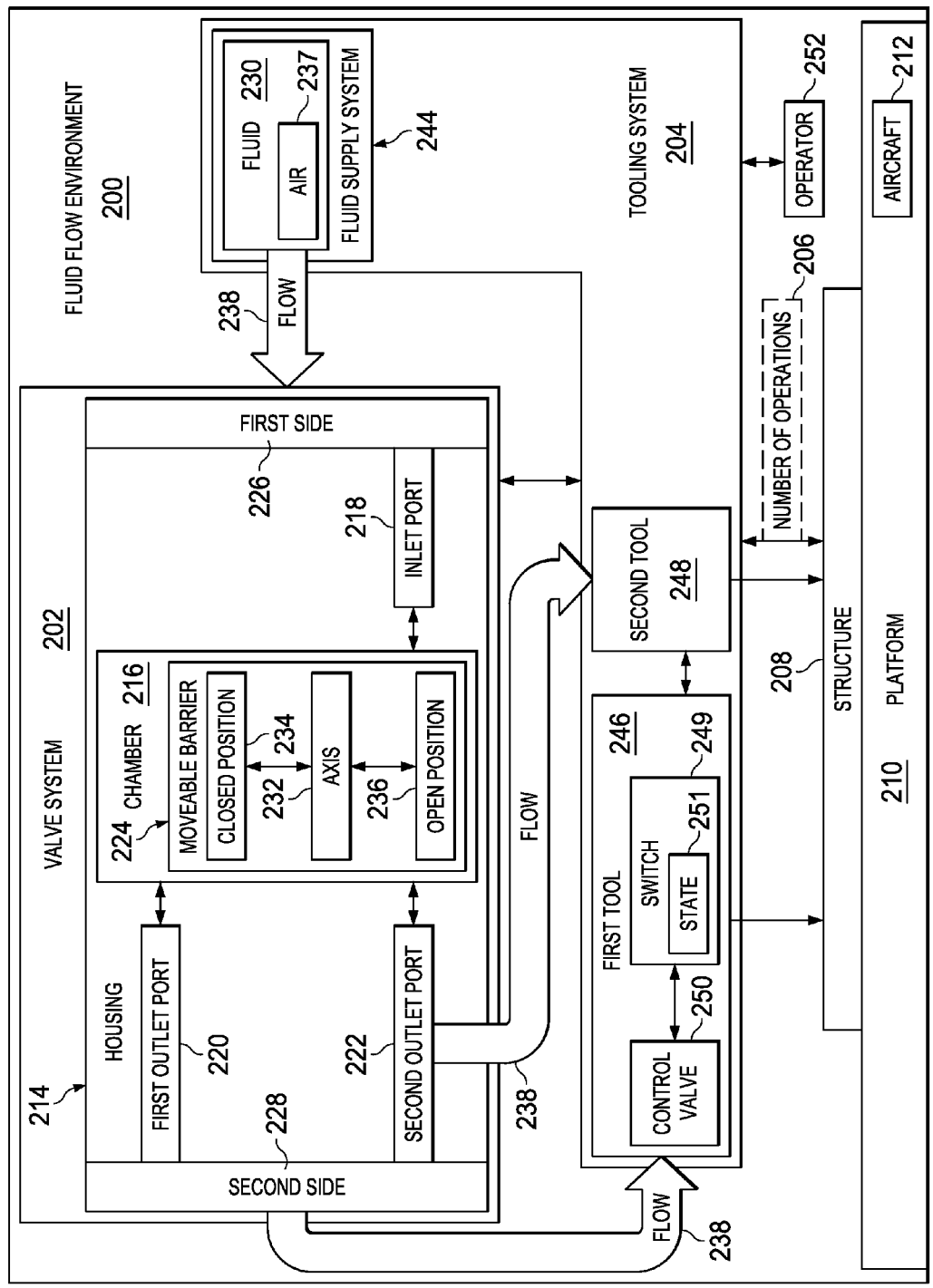
FIG. 2 is an illustration of a block diagram of a fluid flow environment in accordance with an illustrative embodiment.

Turning next to FIG. 2, an illustration of a block diagram of a fluid flow environment is depicted in accordance with an illustrative embodiment. In this depicted example, fluid flow environment 200 is an environment in which valve system 202 is used to direct fluid flow to tooling system 204. Fluid flow environment 100 in FIG. 1 is an example of a physical implementation for fluid flow environment 200 shown in block form in this figure.

As illustrated, tooling system 204 is used to perform number of operations 206 on structure 208. As used herein, a "number of" items may be one or more items. In this illustrative example, number of operations 206 is one or more operations. Number of operations 206 may include, for example, without limitation, at least one of grinding, welding, drilling, milling, vacuuming, blowing, sanding, heating, cooling, cutting, sawing, inspecting, or other suitable types of operations.

As depicted, structure 208 is an object configured for use in platform 210. For instance, structure 208 may be used to form part of platform 210. As another illustrative example, structure 208 may be attached to platform 210.

In this illustrative example, structure 208 may take various forms. For instance, structure 208 may take the form of a structural member, a frame, a spar, a stringer, a beam, a roof, a panel, a wheel, a control surface, a compartment, a seat, a door, a reservoir, a pillar, a tank, a housing, a rod, and other suitable types of structures.

In this depicted example, platform 210 takes the form of aircraft 212. Aircraft 107 in FIG. 1 is an example of a physical implementation for aircraft 212 shown in block form in this figure.

As illustrated, valve system 202 includes a number of different components. In this illustrative example, valve system 202 includes housing 214, chamber 216, inlet port 218, first outlet port 220, second outlet port 222, and moveable barrier 224.

In this depicted example, housing 214 forms the outer structure of valve system 202. Housing 214 may comprise a material selected from at least one of metal, a metal alloy, a composite material, plastic, ceramic, or other suitable types of material.

The material used to form housing 214 is selected to withstand internal pressures within housing 214 during operation of valve system 202. For instance, the material used to form housing 214 may be selected to withstand about 90 pounds per square inch (psi) of pressure within housing 214 during use of valve system 202. This pressure may be more or less, depending on the particular implementation.

As depicted, housing 214 has first side 226 and second side 228. In some cases, first side 226 is opposite second side 228. In other illustrative examples, first side 226 and second side 228 may be adjacent to one another, offset from one another, or have some other orientation. In this depicted example, inlet port 218 is located on first side 226 of housing 214. First outlet port 220 and second outlet port 222 are located on second side 228 of housing 214.

As illustrated, housing 214 has chamber 216 inside of housing 214. Chamber 216 is a cavity enclosed by housing 214.

In this illustrative example, inlet port 218 is an opening in valve system 202 through which a fluid may flow. A "port," in this illustrative example, is an opening in housing 214. The opening may be a portion of housing 214 where housing 214 extends to provide a structure for a connection to a hose, a tool, or some other device. The port may include an internal opening in communication with chamber 216, a channel, and an external opening in communication with another structure.

When one component is "in communication with" another component, the first component is configured to transfer a medium with the second component. For example, the first component may transfer a fluid to the second component.

Inlet port 218 is in communication with chamber 216 in this illustrative example. Fluid 230 flows through inlet port 218 into chamber 216.

Fluid 230 may take a number of different forms in this illustrative example. For instance, fluid 230 may be selected from one of air, water, carbon dioxide, a hydraulic fluid, oil, and other suitable types of fluid. Fluid 230 is selected based on the type of tools used in tooling system 204.

In this illustrative example, fluid 230 takes the form of air 237. Air 237 is supplied to tooling system 204 through first outlet port 220 and second outlet port 222 in valve system 202.

As illustrated, first outlet port 220 and second outlet port 222 are openings in valve system 202 that direct fluid 230 to tooling system 204. First outlet port 220 is in communication with chamber 216. In this illustrative example, fluid 230 flows through chamber 216 from inlet port 218 and out of first outlet port 220.

In a similar fashion, second outlet port 222 is in communication with chamber 216. In this illustrative example, fluid 230 flows through chamber 216 from inlet port 218 and out of second outlet port 222.

In this depicted example, moveable barrier 224 is located in chamber 216. Moveable barrier 224 is a structure that directs fluid 230 through second outlet port 222. In this illustrative example, moveable barrier 224 is rotatable about axis 232 between closed position 234 and open position 236.

In this illustrative example, axis 232 is an axis that extends centrally through housing 214. Axis 232 is located between first outlet port 220 and second outlet port 222.

As illustrated, moveable barrier 224 covers second outlet port 222 in closed position 234. In this illustrative example, closed position 234 reduces flow 238 of fluid 230 through chamber 216 and out of second outlet port 222.

As used herein, a "flow" of fluid 230 represents the movement of fluid 230 through a system. Flow 238 may be represented as a volume fluid moving per unit time. "Flow" may also be referred to as "flow rate" and used interchangeably.

In this illustrative example, flow 238 of fluid 230 is in the direction of at least one of first outlet port 220 or second outlet port 222. Flow 238 of fluid 230 from inlet port 218 to first outlet port 220 may be about 6-8 cubic feet per minute (CFM). In other examples, flow 238 may be more or less, depending on the particular implementation.

In this illustrative example, closed position 234 of moveable barrier 224 is an orientation of moveable barrier 224 that covers substantially all of second outlet port 222. As a result, fluid 230 may not flow through chamber 216 out of second outlet port 222 when moveable barrier 224 is in closed position 234.

As depicted, moveable barrier 224 partially obscures first outlet port 220 when moveable barrier 224 is in closed position 234. In other words, a portion of moveable barrier 224 is positioned within chamber 216 between inlet port 218 and first outlet port 220 when moveable barrier 224 is in closed position 234. When moveable barrier 224 is in this position, flow 238 of fluid 230 is partially restricted by moveable barrier 224.

In this depicted example, open position 236 of moveable barrier 224 is an orientation for moveable barrier 224 that uncovers at least a portion of second outlet port 222. In this depicted example, all of second outlet port 222 is uncovered when moveable barrier 224 is in open position 236. As a result, open position 236 allows fluid 230 to flow through chamber 216 and out of second outlet port 222.

In this depicted example, moveable barrier 224 moves between closed position 234 and open position 236 in response to flow 238 of fluid 230 from inlet port 218 through first outlet port 220. For instance, moveable barrier 224 moves from closed position 234 to open position 236 in response to an increase in flow 238 of air 237 flowing through inlet port 218 and out of first outlet port 220. Flow 238 must provide sufficient force against moveable barrier 224 to push moveable barrier 224 from closed position 234 to open position 236.

As illustrated, moveable barrier 224 is in open position 236 when fluid 230 flows out of first outlet port 220 with sufficient force to move moveable barrier 224. Moveable barrier 224 is in closed position 234 when flow 238 of fluid 230 out of first outlet port 220 is reduced. Static pressure of fluid 230 in chamber 216 holds moveable barrier 224 against second outlet port 222 to close second outlet port 222. In this manner, moveable barrier 224 moves between closed position 234 and open position 236 in response to flow 238 of fluid 230 flowing out of first outlet port 220 and the forces acting on moveable barrier 224.

In this illustrative example, tooling system 204 includes a number of different components. Tooling system 204 includes fluid supply system 244, first tool 246, and second tool 248 in this illustrative example.

As depicted, fluid supply system 244 is connected to inlet port 218 of valve system 202. First tool 246 is connected to first outlet port 220 of valve system 202. Second tool 248 is connected to second outlet port 222 of valve system 202. In this illustrative example, moveable barrier 224 controls flow 238 of fluid 230 to second tool 248 based on activation of first tool 246.

In this depicted example, fluid supply system 244 is a device that provides fluid 230 for use by first tool 246 and second tool 248. In particular, fluid supply system 244 is configured to direct fluid 230 into valve system 202. Valve system 202 then directs fluid 230 to first tool 246 and second tool 248.

When first tool 246 and second tool 248 are pneumatic tools, fluid supply system 244 may include an air compressor. In this case, fluid supply system 244 directs air 237 into valve system 202 to supply first tool 246 and second tool 248 with air 237 to use during number of operations 206.

In this illustrative example, fluid supply system 244 also may include a number of additional valves, hoses, connectors, and other suitable components. These components are arranged such that fluid supply system 244 directs air 237 into valve system 202 in a desired manner.

First tool 246 may take various forms. For instance, first tool 246 may be selected from one of a drill, a grinder, a hammer, a wrench, a saw, a cutter, a mill, a welder, and other suitable types of tools. First tool 246 is a primary tool in this illustrative example. In other words, first tool 246 is the tool primarily used to perform number of operations 206 on structure 208.

As an example, when number of operations 206 includes a cutting operation, first tool 246 is a saw. In another illustrative example, when number of operations 206 includes a grinding operation, first tool 246 is a grinder. Pneumatic drill 118 in FIG. 1 is an example of a physical implementation of first tool 246 shown in block form in this figure.

In this depicted example, second tool 248 may be used simultaneously with first tool 246. Second tool 248 is used "simultaneously" with first tool 246 when both tools are used the same time. Second tool 248 may be selected from one of a cooling system, a vacuum, a nozzle, a heating system, a blower and other suitable tools.

In this illustrative example, second tool 248 is an accessory tool. An accessory tool is used in conjunction with a primary tool to assist in performing work on structure 208. For instance, when first tool 246 is a drill, second tool 248 may be a vacuum configured to collect debris caused by the drilling.

As another example, when first tool 246 is a grinder, second tool 248 may be a blower configured to direct debris away from the work area. In still another example, when first tool 246 is a hammer, second tool 248 may be a nozzle that directs cool air on the surface of structure 208 such that a desired interference fit of a fastener may be achieved. Pneumatic vacuum 120 shown in FIG. 1 is an example of a physical implementation of second tool 248.

In this illustrative example, first tool 246 includes switch 249 and control valve 250. Switch 249 is a device used to activate and deactivate first tool 246. In this depicted example, switch 249 may be selected from one of a button, a lever, a flipper, a knob, a control, a dial, and other suitable types of switches.

Switch 249 has state 251. State 251 is the condition of switch 249. In this illustrative example, state 251 of switch 249 may be selected from one of activated, deactivated, online, offline, standby, or some other suitable state.

In this illustrative example, first tool 246 is activated when fluid 230 flows to first tool 246. First tool 246 is deactivated when fluid 230 does not flow to first tool 246.

When first tool 246 is activated, control valve 250 opens and fluid 230 flows into first tool 246 from chamber 216 of valve system 202. When first tool 246 is deactivated, control valve 250 closes and fluid 230 does not flow through control valve 250 and into first tool 246.

In this illustrative example, flow 238 of fluid 230 to second tool 248 is controlled based on the activation of first tool 246. When switch 249 is used to activate first tool 246, flow 238 of fluid 230 through inlet port 218 through chamber 216 and out of first outlet port 220 into first tool 246 rotates moveable barrier 224 about axis 232 from closed position 234 to open position 236. Flow 238 of fluid 230 through second outlet port 222 increases when first tool 246 is activated. In this manner, when moveable barrier 224 is in open position 236, fluid 230 flows through second outlet port 222 to supply second tool 248.

When switch 249 is used to deactivate first tool 246, flow 238 of fluid 230 through inlet port 218 through chamber 216 and out of first outlet port 220 into first tool 246 ceases. As a result, moveable barrier 224 rotates about axis 232 from open position 236 to closed position 234. In this depicted example, flow 238 of fluid 230 through second outlet port 222 is reduced or eliminated when first tool 246 is deactivated and moveable barrier 224 returns to closed position 234.

In this illustrative example, operator 252 uses tooling system 204 to perform number of operations 206 on structure 208. Operator 252 is a human operator in this illustrative example. In other illustrative examples, operator 252 may take the form of a robotic device. This robotic device may be, for example, a robotic arm. Operator 252 uses switch 249 to activate and deactivate first tool 246 to control the supply of fluid 230 to second tool 248.

The illustration of valve system 202 in FIG. 2 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For instance, platform 210 may take other forms other than aircraft 212. Platform 210 may be, for example, without limitation, a mobile platform, a stationary platform, a land-based structure, an aquatic-based structure, and a space-based structure. More specifically, platform 210 may be a surface ship, a tank, a personnel carrier, a train, a spacecraft, a space station, a satellite, a submarine, an automobile, a power plant, a bridge, a dam, a house, a manufacturing facility, a building, and other suitable platforms.

As another example, tooling system 204 may include one or more tools in addition to first tool 246 and second tool 248. These additional tools may be operated simultaneously with first tool 246. In some illustrative examples, the additional tools may be activated through a valve system similar to valve system 202.

In still another illustrative example, valve system 202 may have one or more outlet ports in addition to first outlet port 220 and second outlet port 222. Valve system 202 also may have one or more additional inlet ports.

In yet another example, axis 232 may not run centrally through housing 214. Instead, axis 232 may be an axis running through a different portion of housing 214, depending on the particular implementation.

As another example, valve system 202 may have other applications other than directing fluid flow to a first tool and a second tool. For example, valve system 202 may be integrated into aircraft 212 in some other manner to control fluid flow to systems within aircraft 212. In this case, fluid flow through two lines may be controlled by activation of a single device connected to the primary line.

Figure 3:
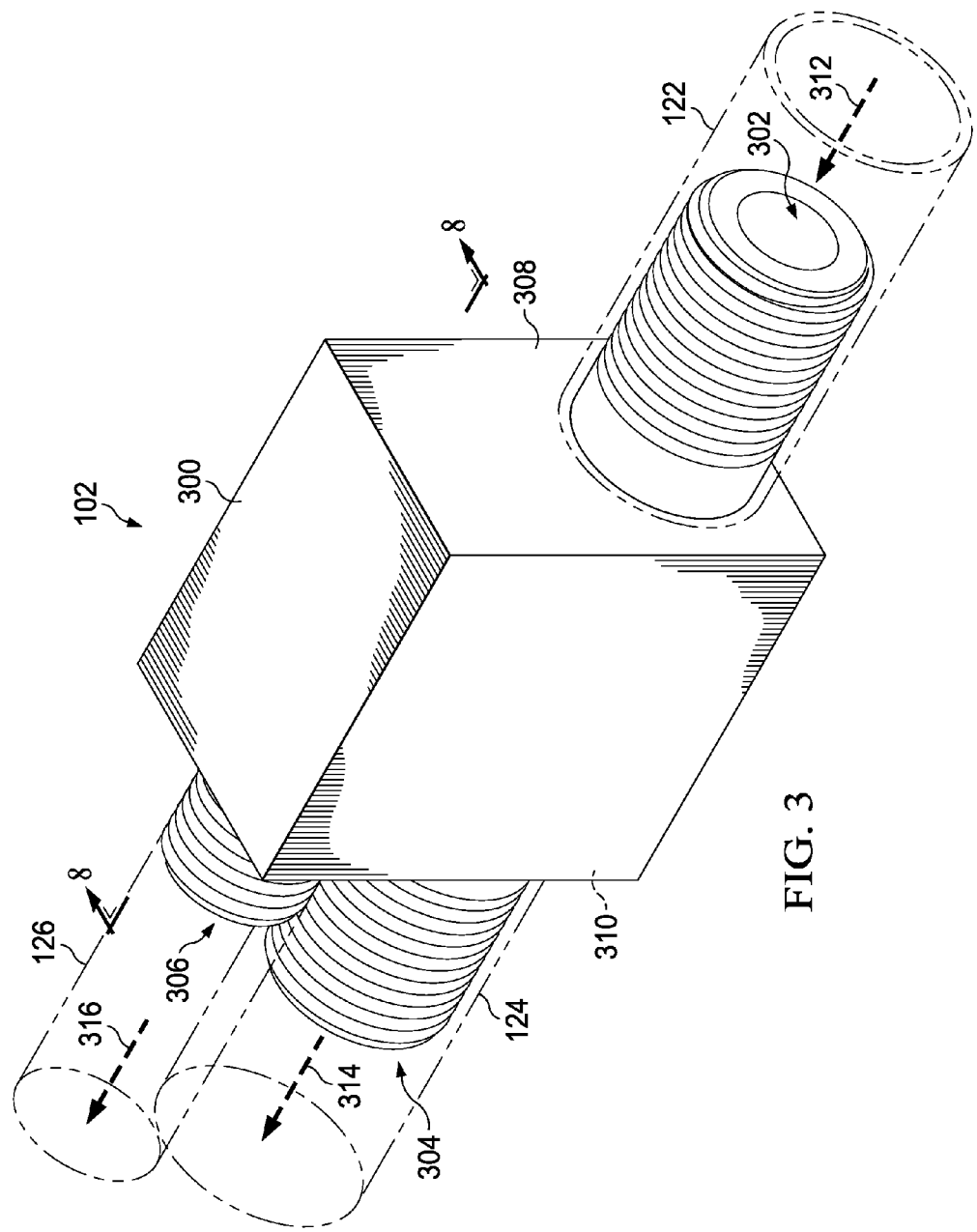
FIG. 3 is an illustration of a perspective view of a valve system in accordance with an illustrative embodiment.

With reference now to FIG. 3, an illustration of a perspective view of a valve system is depicted in accordance with an illustrative embodiment. In this depicted example, components within valve system 102 from FIG. 1 are shown in greater detail.

As depicted, valve system 102 includes housing 300, inlet port 302, outlet port 304, and outlet port 306. Inlet port 302 is located on side 308 of housing 300. Outlet port 304 and outlet port 306 are located on second side 310 of housing 300. In this illustrative example, side 308 is opposite second side 310.

In this depicted example, outlet port 304 and outlet port 306 are located adjacent to one another. In other words, outlet port 304 and outlet port 306 are side by side. Inlet port 302 is located directly opposite outlet port 304.

In this example, inlet port 302 is connected to air supply system 114, outlet port 304 is connected to pneumatic drill 118, and outlet port 306 is connected to pneumatic vacuum 120 shown in FIG. 1. Specifically, inlet port 302, outlet port 304, and outlet port 306 are connected to a respective air line in this illustrative example.

In this depicted example, air enters housing 300 of valve system 102 through inlet port 302 in the direction of arrow 312. Air may flow through housing 300 and out of outlet port 304 in the direction of arrow 314 when pneumatic drill 118 is activated. Air also may flow out of outlet port 306 in the direction of arrow 316 to pneumatic vacuum 120 when pneumatic drill 118 is activated.

Figure 4:
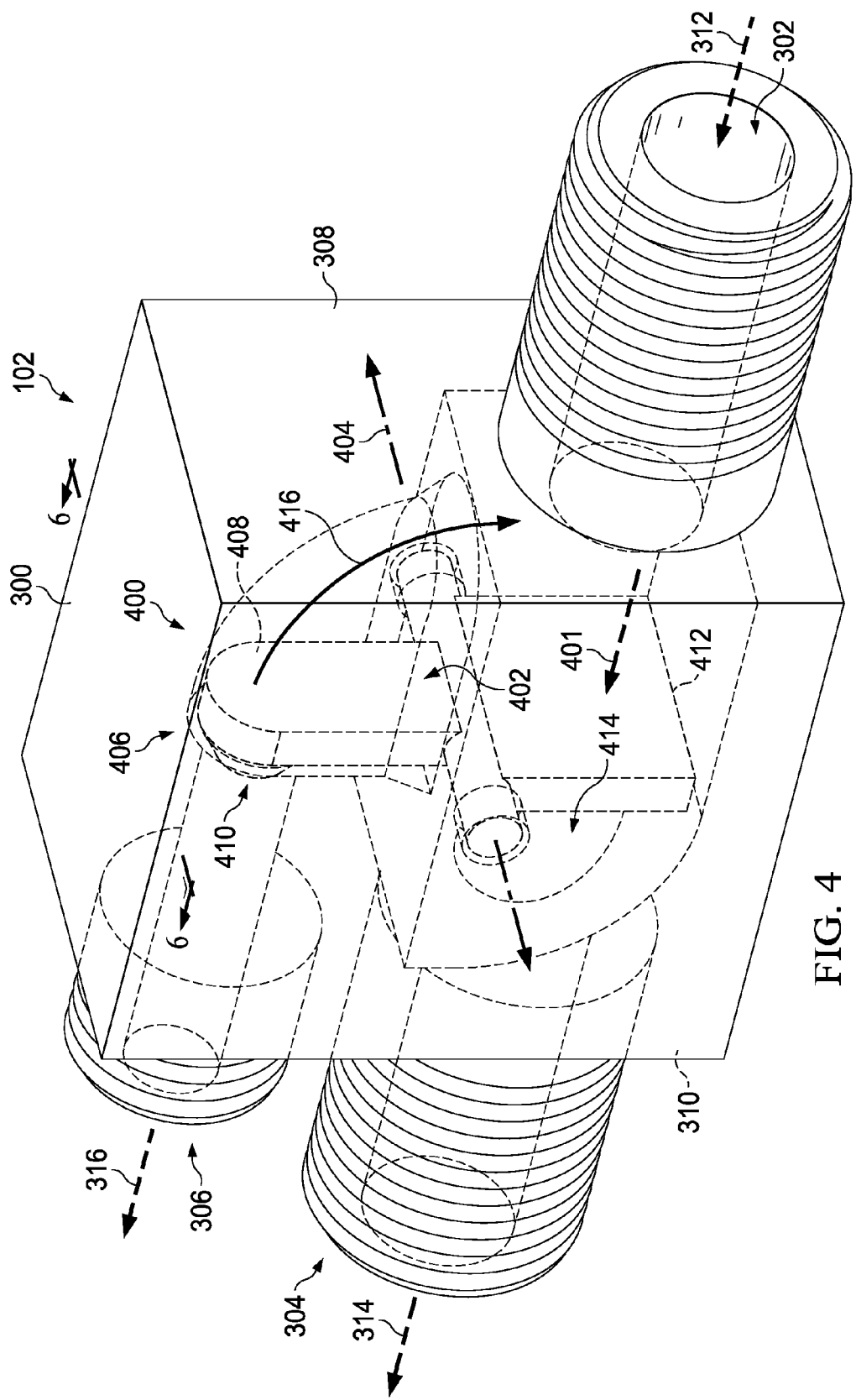
FIG. 4 is an illustration of a valve system in accordance with an illustrative embodiment.

Turning next to FIG. 4, an illustration of a valve system is depicted in accordance with an illustrative embodiment. In this depicted example, housing 300 of valve system 102 is shown in phantom such that components within housing 300 may been seen in greater detail.

As illustrated, housing 300 has chamber 400 inside of housing 300. Air enters chamber 400 through inlet port 302 in the direction of arrow 401.

In this illustrative example, moveable barrier 402 is located within chamber 400 of housing 300. Moveable barrier 402 is rotatable about axis 404 in this illustrative example. Axis 404 is an axis that extends centrally through housing 300.

Moveable barrier 402 is in closed position 406 in this illustrative example. In closed position 406, portion 408 of moveable barrier 402 covers internal opening 410 of outlet port 306.

In this illustrative example, moveable barrier 402 completely covers internal opening 410 of outlet port 306 such that air cannot flow through outlet port 306. In other examples, moveable barrier 402 may substantially cover internal opening 410 of outlet port 306 such that the flow of air through outlet port 306 is reduced to a desired level.

As illustrated, portion 412 of moveable barrier 402 partially obscures internal opening 414 of outlet port 304. Portion 412 of moveable barrier 402 is shaped such that a flow of air in the direction of arrow 401 from inlet port 302 through outlet port 304 causes moveable barrier 402 to move in the direction of arrow 416.

Figure 5:
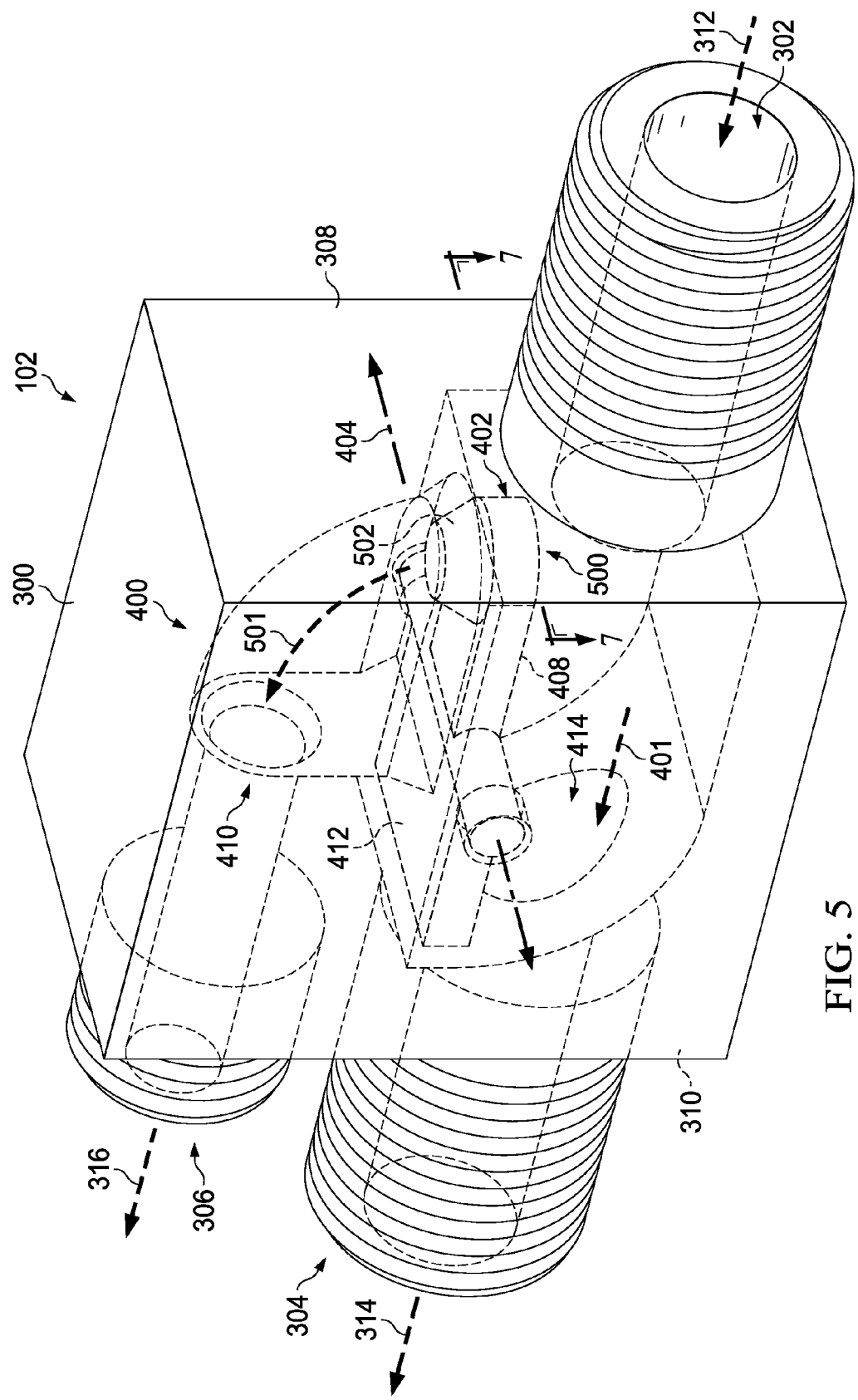
FIG. 5 is an illustration of a valve system in accordance with an illustrative embodiment.

With reference now to FIG. 5, an illustration of a valve system is depicted in accordance with an illustrative embodiment. In this depicted example, valve system 102 from FIG. 4 is shown with moveable barrier 402 in open position 500.

In this illustrative example, moveable barrier 402 has rotated about axis 404 in the direction of arrow 416 in FIG. 4 to open position 500. In open position 500, air may flow through internal opening 414 in outlet port 304 and out of valve system 102. In a similar fashion, air may flow through internal opening 410 of outlet port 306 in the direction of arrow 501 and out of valve system 102.

In this illustrative example, portion 408 of moveable barrier 402 has protrusion 502. Protrusion 502 is configured to cover internal opening 410 of outlet port 306. Specifically, protrusion 502 is configured to fill internal opening 410 of outlet port 306 when moveable barrier 402 is in closed position 406. In this manner, moveable barrier 402 seals outlet port 306 such that air cannot flow through outlet port 306.

In this illustrative example, protrusion 502 may be made from a different material than other portions of moveable barrier 402. For example, protrusion 502 may be made from rubber, another material, or have a coating that can form a seal for internal opening 410 of outlet port 306.

Figure 6:
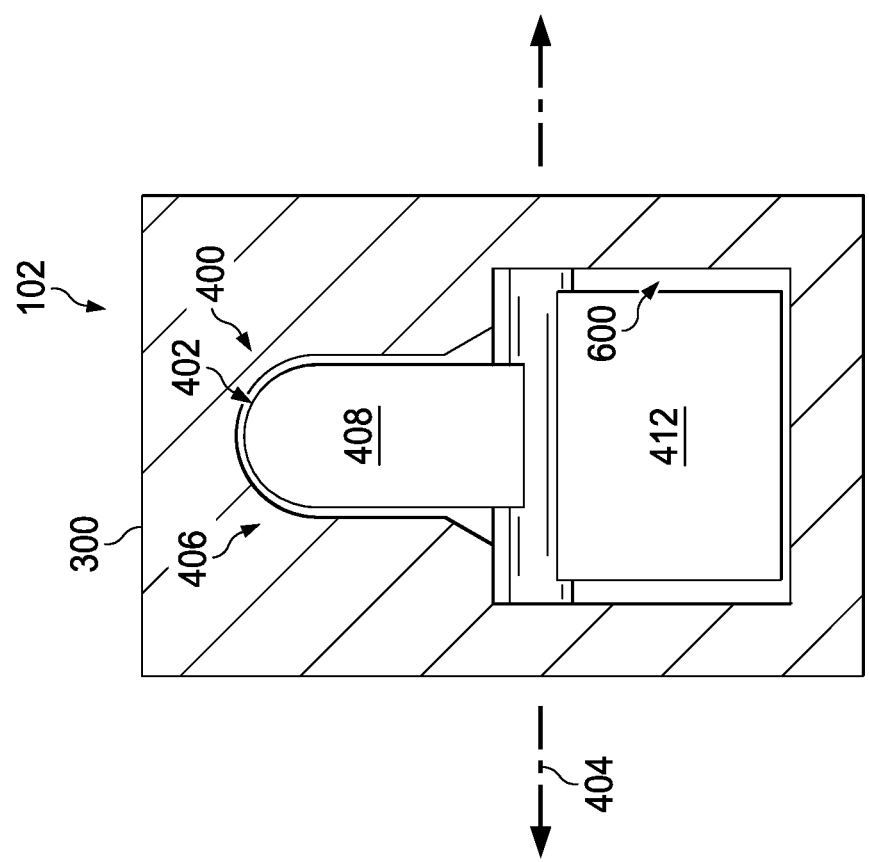
FIG. 6 is an illustration of a cross-sectional view of a valve system in accordance with an illustrative embodiment.

In FIG. 6, an illustration of a cross-sectional view of a valve system is depicted in accordance with an illustrative embodiment. In this depicted example a cross-sectional view of valve system 102 taken along lines 6-6 in FIG. 4 is shown.

As depicted, portion 408 of moveable barrier 402 completely covers internal opening 410 of outlet port 306 shown in FIGS. 3-4 in closed position 406. Gap 600 is present between portion 412 of moveable barrier 402 and housing 300 of valve system 102. In this manner, portion 412 of moveable barrier 402 does not completely block air from reaching internal opening 414 of outlet port 304 shown in FIGS. 3-4.

As seen in this view, portion 408 and portion 412 are different sizes. The relative sizes of portion 412 and portion 408 are selected such that the flow of air working against portion 412 is enough to overcome pressure acting on portion 408 to hold moveable barrier 402 to block internal opening 410.

Figure 7:
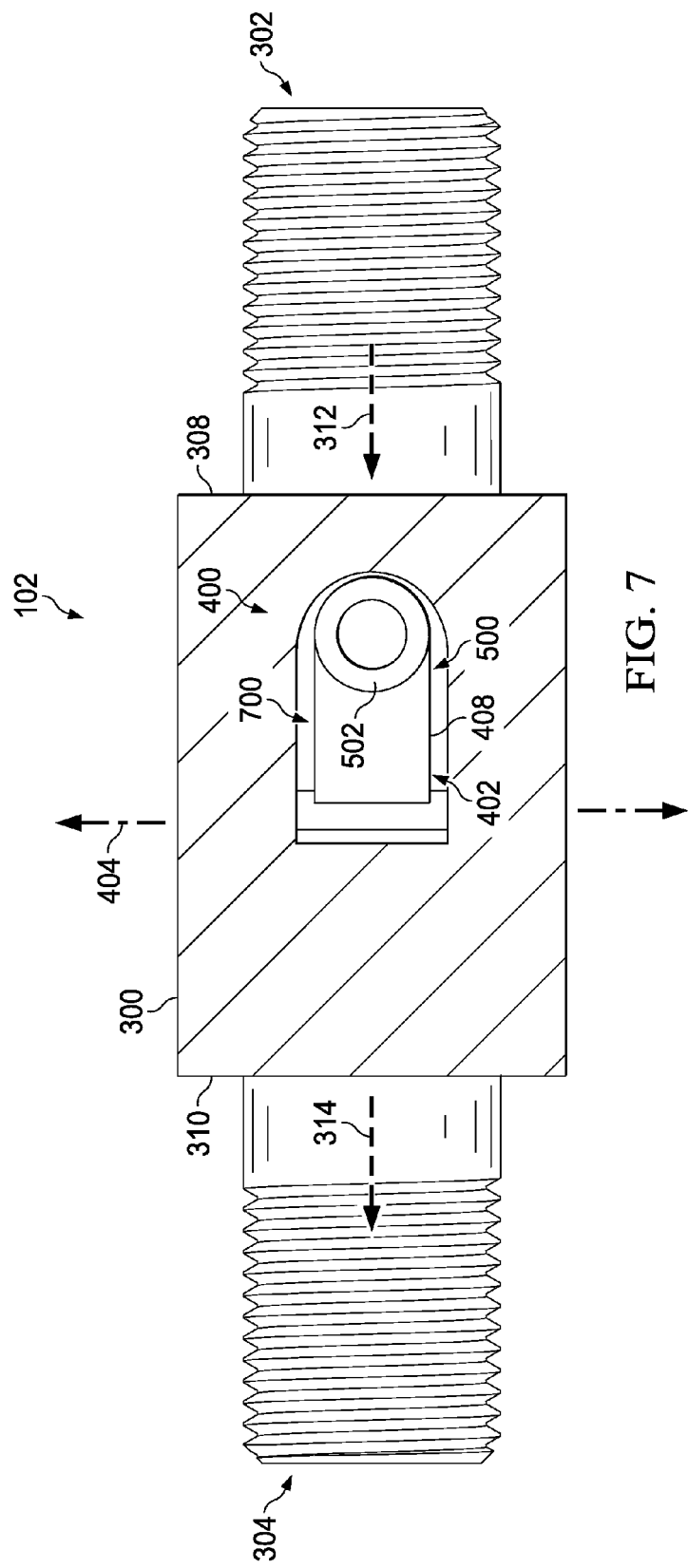
FIG. 7 is an illustration of a cross-sectional view of a valve system in accordance with an illustrative embodiment.

Turning to FIG. 7, an illustration of a cross-sectional view of a valve system is depicted in accordance with an illustrative embodiment. In this depicted example, a cross-sectional view of valve system 102 taken along lines 7-7 in FIG. 5 is shown.

As illustrated, gap 700 is present between portion 412 of moveable barrier 402 and housing 300 of valve system 102 when moveable barrier 402 is in open position 500. The shape of portion 408 of moveable barrier 402 allows air to flow freely through gap 700. In this manner, air flows through gap 700 and through outlet port 304. In this illustrative example, gap 700 is critical in allowing air flow past portion 408 enough that drag will cause moveable barrier 402 to close against internal opening 410 shown in FIGS. 3-4 should flow in direction of arrow 314 cease as a result of pneumatic drill 118 in FIG. 1 being deactivated.

Figure 8:
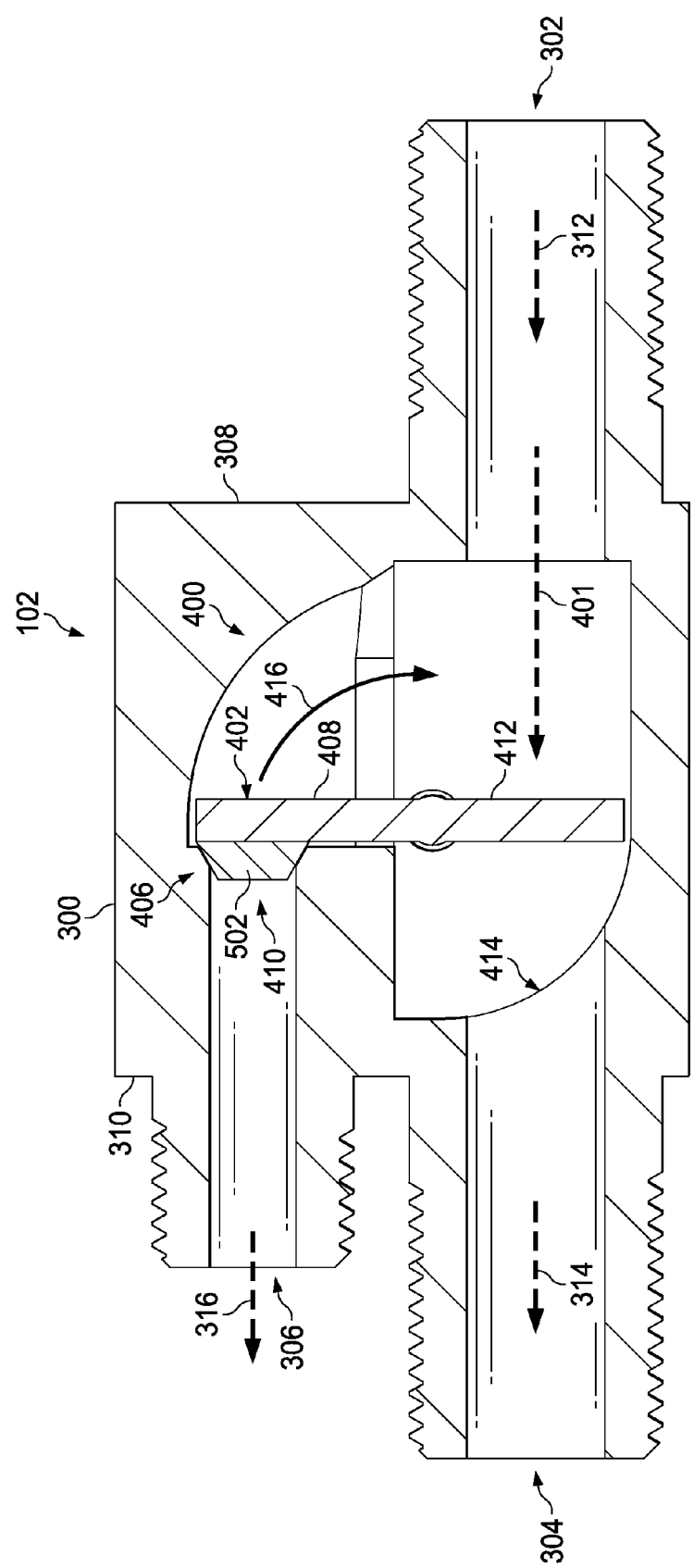
FIG. 8 is an illustration of a cross-sectional view of a valve system in accordance with an illustrative embodiment.
Figure 9:
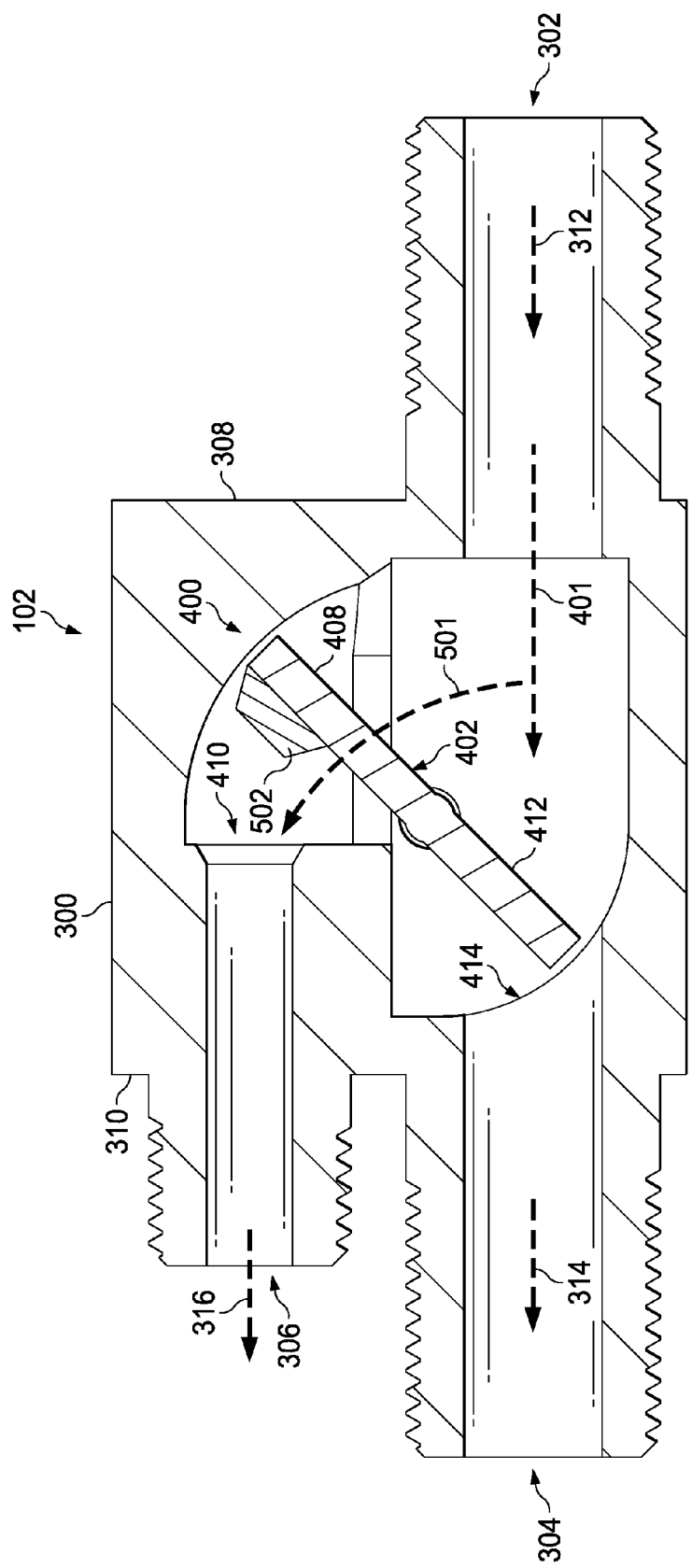
FIG. 9 is an illustration of a cross-sectional view of a valve system in accordance with an illustrative embodiment.
Figure 10:
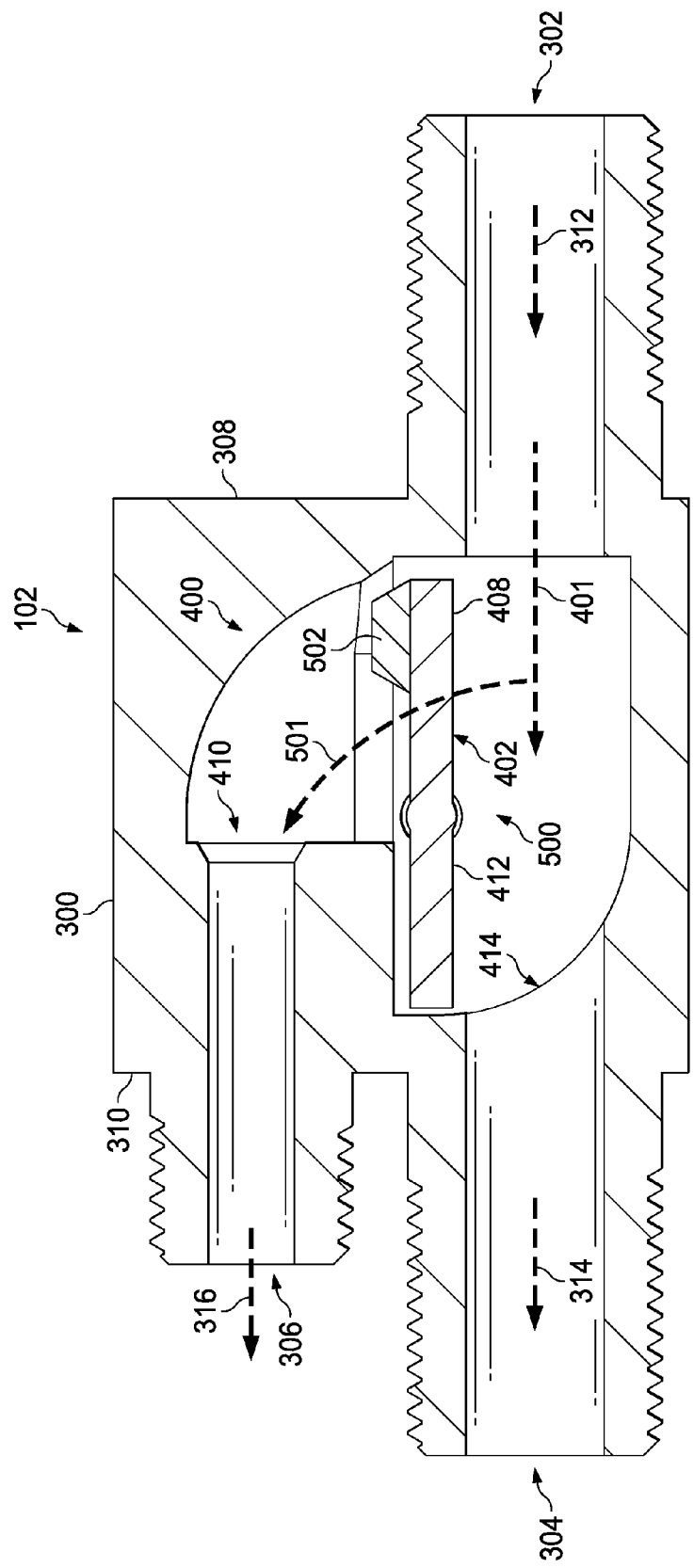
FIG. 10 is an illustration of a cross-sectional view of a valve system in accordance with an illustrative embodiment.

FIGS. 8-10 are illustrations of a cross-sectional view of a valve system depicted in accordance with an illustrative embodiment. In FIG. 8, a cross-sectional view of valve system 102 taken along the lines 8-8 in FIG. 3 is shown. FIGS. 8-10 show moveable barrier 402 moving from closed position 406 to open position 500.

In FIG. 8, air flows through inlet port 302 in the direction of arrow 401. The flow of air exerts a force on portion 412 of moveable barrier 402 to rotate moveable barrier 402 in the direction of arrow 416 between closed position 406 and open position 500 shown in FIG. 10.

FIG. 9 shows moveable barrier 402 moving in the direction of arrow 416 shown in FIG. 4. The force exerted by the flow of air continues to move portion 412 of moveable barrier 402. As moveable barrier 402 continues to rotate, air flows in the direction of arrow 501 through outlet port 306.

In FIG. 10, air flows freely in the direction of arrow 401 and arrow 501. The dynamic pressure of air flow out of outlet port 304 maintains open position 500 of moveable barrier 402.

Turning now to FIG. 11, an illustration of a schematic of a tooling system is depicted in accordance with an illustrative embodiment. In this depicted example, a schematic of tooling system 104 from FIG. 1 is shown.

As depicted, the components within tooling system 104 are shown in phantom such that the direction of air flowing through tooling system 104 may be seen. In this illustrative example, air flows in the direction of arrow 1100 from air supply system 114 through air line 122.

Lever 1102 of pneumatic drill 118 has been activated in this illustrative example. In particular, lever 1102 has been depressed such that air flows through valve system 102 and into pneumatic drill 118.

Air also flows to pneumatic vacuum 120 when moveable barrier 402 in valve system 102 is in an open position. Pneumatic vacuum 120 generates suction in the direction of arrow 1104 in this illustrative example.

With reference to FIG. 12, an illustration of a schematic of a tooling system is depicted in accordance with an illustrative embodiment. In this depicted example, lever 1102 from FIG. 11 has been released, stopping the flow of air through pneumatic drill 118.

As depicted, when air does not flow to pneumatic drill 118, air is directed toward outlet port 306, to the path of least resistance. The flow of this air forces portion 408 of moveable barrier 402 toward the internal opening in outlet port 306.

Moveable barrier 402 in valve system 102 returns to closed position 406 such that no air flows to pneumatic vacuum 120. Both devices are deactivated in this illustrative example.

The illustrations of valve system 102 and the components within valve system 102 in FIG. 1 and FIGS. 3-12 are not meant to imply physical or architectural limitations to the manner in which an illustrative embodiment may be implemented. Other components in addition to or in place of the ones illustrated may be used. Some components may be optional.

The different components shown in FIG. 1 and FIGS. 3-12 may be illustrative examples of how components shown in block form in FIG. 2 can be implemented as physical structures. Additionally, some of the components in FIG. 1 and FIGS. 3-12 may be combined with components in FIG. 2, used with components in FIG. 2, or a combination of the two.

As an example, although inlet port 302 is shown on an opposite side of outlet port 304 and outlet port 306, one or more ports may be arranged in different orientation than shown. For instance, outlet port 306 may be located on a different side than outlet port 304. These sides may be adjacent to one another. Other configurations also may be realized, depending on the functionality desired for valve system 102.

Figure 13:
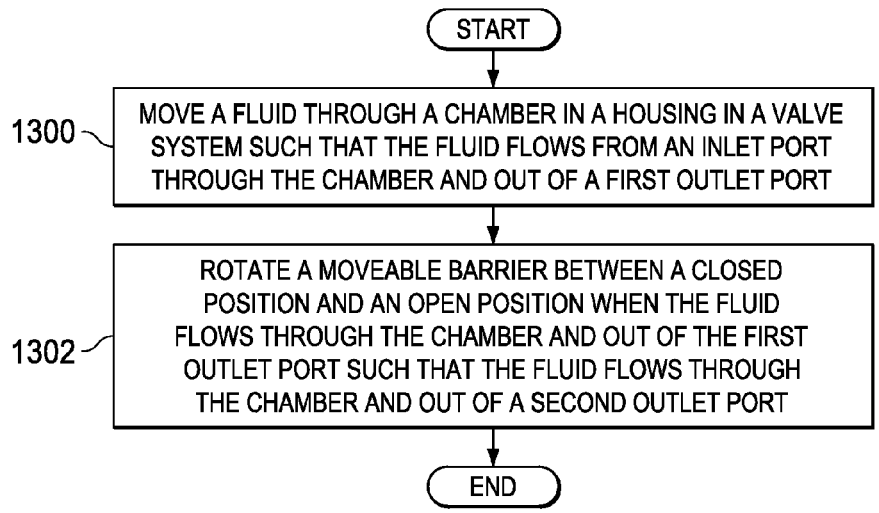
FIG. 13 is an illustration of a flowchart of a process for directing a flow of a fluid in accordance with an illustrative embodiment.

With reference now to FIG. 13, an illustration of a flowchart of a process for directing a flow of a fluid is depicted in accordance with an illustrative embodiment. The process illustrated in FIG. 13 may be implemented in fluid flow environment 200 in FIG. 2. The different operations may be implemented in valve system 202 to direct flow 238 of fluid 230 to second tool 248.

The process begins by moving a fluid through a chamber in a housing in a valve system such that the fluid flows from an inlet port through the chamber and out of a first outlet port (operation 1300). The process then rotates a moveable barrier between a closed position and an open position when the fluid flows through the chamber and out of the first outlet port such that the fluid flows through the chamber and out of a second outlet port (operation 1302) with the process terminating thereafter.

Figure 14:
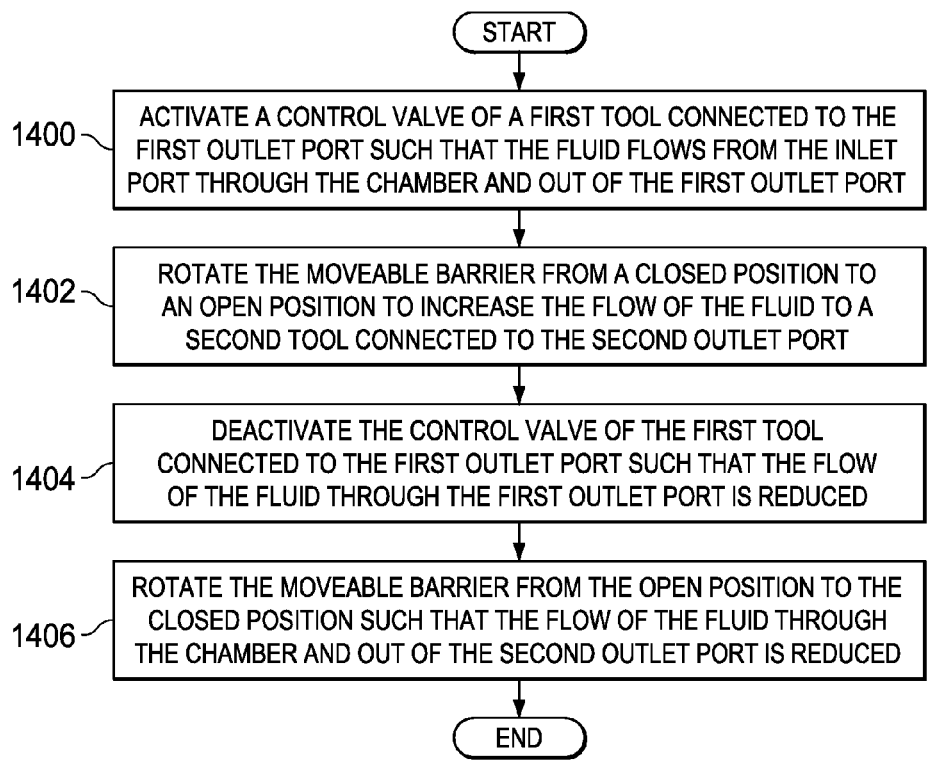
FIG. 14 is an illustration of a flowchart of a process for directing a flow of a fluid in accordance with an illustrative embodiment.

Referring next to FIG. 14, an illustration of a flowchart of a process for directing a flow of a fluid is depicted in accordance with an illustrative embodiment. The process illustrated in FIG. 13 may be implemented in fluid flow environment 200 in FIG. 2. The different operations may be implemented in valve system 202 to simultaneously operate first tool 246 and second tool 248. The operation of second tool 248 is controlled by activation of first tool 246.

The process begins by activating a control valve of a first tool connected to the first outlet port such that the fluid flows from the inlet port through the chamber and out of the first outlet port (operation 1400). In response to activating the control valve of the first tool, the process then rotates the moveable barrier from a closed position to an open position to increase the flow of the fluid to a second tool connected to the second outlet port (operation 1402).

The process then deactivates the control valve of the first tool connected to the first outlet port such that the flow of the fluid through the first outlet port is reduced (operation 1404). In response to deactivating the control valve of the first tool, the process then rotates the moveable barrier from the open position to the closed position such that the flow of the fluid through the chamber and out of the second outlet port is reduced (operation 1406), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method in the form of a block diagram is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft in the form of a block diagram is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. In particular, valve system 202 from FIG. 2 may be used to direct fluid 230 to tooling system 204 for use in performing work on aircraft 1600 during any one of the stages of aircraft manufacturing and service method 1500.

For example, without limitation, valve system 202 may be used to direct fluid 230 to first tool 246 and second tool 248 during at least one of component and subassembly manufacturing 1506, system integration 1508, routine maintenance and service 1514, or some other stage of aircraft manufacturing and service method 1500. As an example, valve system 202 may be used to direct air 237 to tooling system 204 for manufacturing of parts for aircraft 1600 during component and subassembly manufacturing 1506. In another illustrative example, valve system 202 may be used to direct air 237 to tooling system 204 during upgrades, refurbishment, or other operations performed during maintenance and service 1514.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or a combination thereof. The use of a number of the different illustrative embodiments may substantially expedite the assembly, reduce the cost of aircraft 1600, or both.

Thus, the illustrative embodiments provide a method and apparatus for directing flow 238 of fluid 230 through valve system 202. Valve system 202 has housing 214 having chamber 216 inside of housing 214, inlet port 218, first outlet port 220, second outlet port 222, and moveable barrier 224. Inlet port 218 is in communication with chamber 216. First outlet port 220 and second outlet port 222 are also in communication with chamber 216. Moveable barrier 224 is located in chamber 216 and rotatable about axis 232 between closed position 234 and open position 236. Moveable barrier 224 covers second outlet port 222 when moveable barrier 224 is in closed position 234. Open position 236 of moveable barrier 224 allows fluid 230 to flow through chamber 216 and out of second outlet port 222. Closed position 234 reduces flow 238 of fluid 230 through chamber 216 and out of second outlet port 222.

With the use of valve system 202, an operator may activate a primary tool and an accessory tool using only one device. Valve system 202 with moveable barrier 224 provides coordinated control of both the primary tool and the accessory tool without manually having to turn off the accessory tool.

Additionally, valve system 202 may be integrated into currently used pneumatic tooling systems with ease. The tools, air compressor, or other components within the setup do not need to be modified to integrate valve system 202. Instead, valve system 202 may be easily connected to currently used air lines. Because valve system 202 can be used without modifying existing tools, minimal additional cost is required.

Valve system 202 also may prolong the life of components within the tooling system. For example, because an operator may shut off both devices at once, the air compressor is not continuously having to supply air to the accessory tool when the accessory tool is not being used. As a result, valve system 202 may save power and prolong the life of the air compressor.

Further, the use of valve system 202 promotes efficient operation of tooling system 204. In particular, valve system 202 saves time when an operator is performing operations on a structure. The time saved by valve system 202 may decrease the cost of manufacturing the structure.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a housing having a chamber inside of the housing;
    an inlet port in communication with the chamber;
    a first outlet port in communication with the chamber;
    a second outlet port in communication with the chamber; and
    a moveable barrier located in the chamber, wherein the moveable barrier is rotatable about an axis between a closed position and an open position, wherein in the open position the moveable barrier allows a fluid to flow from the inlet port into both the first outlet port and the second outlet port, and wherein in the closed position the moveable barrier seals the second outlet port to prevent the fluid from moving through the second outlet port and also reduces flow of the fluid from the inlet port to the first outlet port, relative to flow of the fluid to the first outlet port when the moveable barrier is in the open position.

2. The apparatus of claim 1, wherein the moveable barrier is in the open position when the fluid flows through the first outlet port.

3. The apparatus of claim 2, wherein the moveable barrier is in the closed position when the flow of the fluid through the first outlet port is reduced.

4. The apparatus of claim 1, wherein the moveable barrier moves between the closed position and the open position in response to the flow of the fluid from the inlet port through the first outlet port.

5. The apparatus of claim 1, wherein the fluid is selected from one of air, water, carbon dioxide, a hydraulic fluid, and oil.

6. The apparatus of claim 1, wherein the first outlet port is connected to a first tool and the second outlet port is connected to a second tool.

7. The apparatus of claim 6, wherein the flow of the fluid through the second outlet port increases when the first tool is activated, and wherein the flow of the fluid through the second outlet port is reduced when the first tool is deactivated.

8. The apparatus of claim 6, wherein the first tool is selected from one of a drill, a grinder, a hammer, a wrench, a saw, a cutter, a mill, and a welder and wherein the second tool is selected from one of a cooling system, a vacuum, a nozzle, a heating system, and a blower.

9. The apparatus of claim 1, wherein the moveable barrier comprises:
    an axle that defines the axis and is disposed between the first outlet port and the second outlet port;
    a first portion extending from the axle, wherein the first portion incompletely covers the first outlet port when the moveable barrier is in the closed position; and
    a second portion extending from the axle in a direction opposite the first portion, wherein the second portion seals the second outlet port when the moveable barrier is in the closed position.

10. The apparatus of claim 9, wherein the second portion includes a protrusion on a side of the second portion, and wherein the moveable barrier is positioned such that the protrusion enters into the second outlet port to effect sealing of the second outlet port when the moveable barrier is in the closed position.

11. A method for directing a flow of a fluid through an apparatus comprising:
    a housing having a chamber inside of the housing;
    an inlet port in communication with the chamber;
    a first outlet port in communication with the chamber;
    a second outlet port in communication with the chamber; and
    a moveable barrier located in the chamber, wherein the moveable barrier is rotatable about an axis between a closed position and an open position, wherein in the open position the moveable barrier allows a fluid to flow from the inlet port into both the first outlet port and the second outlet port, and wherein in the closed position the moveable barrier seals the second outlet port to prevent the fluid from moving through the second outlet port and also reduces flow of the fluid from the inlet port to the first outlet port, relative to flow of the fluid to the first outlet port when the moveable barrier is in the open position, and wherein the method comprises:
    forcing fluid into the inlet port to create a fluid flow, wherein when the fluid flows into the chamber the moveable barrier moves into the open position and allows the fluid to flow into both the first outlet port and the second outlet port; and
    reducing fluid into the inlet port, wherein when the fluid flow reduces the moveable barrier moves into the closed position, wherein in the closed position the fluid flow is cut off to the second outlet port and also the fluid flow is reduced to the first outlet port relative to the fluid flow to the first outlet port when the moveable barrier is in the open position.

12. The method of claim 11 wherein forcing the fluid comprises:
activating a control valve of a first tool connected to the first outlet port such that the fluid flows from the inlet port through the chamber and out of the first outlet port.

13. The method of claim 12 further comprising:
increasing the flow of the fluid to a second tool connected to the second outlet port in response to activating the control valve of the first tool.

14. The method of claim 13 wherein reducing fluid into the inlet port comprises:
deactivating the control valve of the first tool connected to the first outlet port such that the flow of the fluid through the first outlet port is reduced.

15. The method of claim 14 further comprising:
rotating the moveable barrier from the open position to the closed position such that the flow of the fluid through the chamber and out of the second outlet port is reduced, wherein the moveable barrier is rotated in response to deactivating the control valve of the first tool.

16. A valve system comprising:
a housing having a chamber inside of the housing;
an inlet port located on a first side of the housing and in communication with the chamber;
a first outlet port located on a second side of the housing and in communication with the chamber, wherein the second side is opposite the first side;
a second outlet port located on the second side of the housing and in communication with the chamber; and
a moveable barrier located in the chamber, wherein the moveable barrier is rotatable about an axis between a closed position and an open position, wherein in the open position the moveable barrier allows a fluid to flow from the inlet port into both the first outlet port and the second outlet port, and wherein in the closed position the moveable barrier seals the second outlet port to prevent the fluid from moving through the second outlet port and also reduces flow of the fluid from the inlet port to the first outlet port, relative to flow of the fluid to the first outlet port when the moveable barrier is in the open position.

17. The valve system of claim 16, wherein the moveable barrier moves between the closed position and the open position in response to the flow of the fluid from the inlet port through the first outlet port.

18. The valve system of claim 16, wherein the first outlet port is connected to a first tool having a control valve.

19. The valve system of claim 18, wherein the second outlet port is connected to a second tool used simultaneously with the first tool.

20. The valve system of claim 19, wherein the flow of the fluid through the chamber and out of the second outlet port to the second tool is based on a state of the control valve of the first tool.

* * * * *